US008503402B2

(12) United States Patent
Göransson et al.

(10) Patent No.: US 8,503,402 B2
(45) Date of Patent: Aug. 6, 2013

(54) METHOD AND ARRANGEMENTS FOR LOAD BALANCING OF POWER AMPLIFIERS

(75) Inventors: Bo Göransson, Sollentuna (SE); Bo Hagerman, Tyresö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 908 days.

(21) Appl. No.: 12/441,484

(22) PCT Filed: Sep. 6, 2007

(86) PCT No.: PCT/SE2007/050628
§ 371 (c)(1),
(2), (4) Date: Mar. 16, 2009

(87) PCT Pub. No.: WO2008/033089
PCT Pub. Date: Mar. 20, 2008

(65) Prior Publication Data
US 2010/0061344 A1    Mar. 11, 2010

Related U.S. Application Data

(60) Provisional application No. 60/825,600, filed on Sep. 14, 2006, provisional application No. 60/855,606, filed on Sep. 14, 2006.

(51) Int. Cl.
H04B 7/04        (2006.01)
(52) U.S. Cl.
USPC ............ 370/334; 370/252; 370/335; 370/342
(58) Field of Classification Search
None
See application file for complete search history.

(56) References Cited

U.S. PATENT DOCUMENTS

| 6,795,417 | B2 * | 9/2004 | Zeira et al. ............... 370/335 |
| 6,885,649 | B2 * | 4/2005 | Zeira et al. ............... 370/335 |
| 6,934,271 | B2 * | 8/2005 | Zeira et al. ............... 370/329 |
| 7,221,645 | B2 * | 5/2007 | Wang et al. ............... 370/203 |
| 7,372,912 | B2 * | 5/2008 | Seo et al. .................. 375/267 |
| 7,532,590 | B2 * | 5/2009 | Ok et al. ................... 370/310 |
| 2003/0133424 | A1 * | 7/2003 | Liang et al. ............... 370/335 |
| 2004/0063437 | A1 | 4/2004 | Braun et al. |
| 2005/0002467 | A1 * | 1/2005 | Seo et al. .................. 375/267 |
| 2005/0084027 | A1 * | 4/2005 | Agin ........................ 375/267 |
| 2005/0169216 | A1 * | 8/2005 | Zeira et al. ............... 370/335 |
| 2005/0249305 | A1 * | 11/2005 | Ponnampalam et al. ..... 375/267 |

(Continued)

OTHER PUBLICATIONS 3G. 3GPP TR 25.869 v0.1.0. RP-010344. 3GP TSG RAN Meeting #12 Stockholm, Sweden Jun. 12-15, 2001.

*Primary Examiner* — Jay P Patel

(57) ABSTRACT

The present invention relates to a transmit unit, a control unit and a method in a transmit unit comprising at least two antennas for transmitting signals relating to a plurality of radio channels. The transmit unit transmit signals relating to a first subset of channels from the first antenna and pilot signals from the first antenna for use a reference for the first subset of channels. The transmit unit is further arranged to transmit signals relating to a second subset of channels from the second antenna using single antenna transmission. The transmit unit also transmits pilot signals on a second type of pilot channel such as the S-CPICH, different from the first type of pilot channel, from the second antenna for use as a reference for the second subset of channels, wherein the first and second type of pilot channels are substantially covering the same area.

10 Claims, 6 Drawing Sheets

(56) References Cited

U.S. PATENT DOCUMENTS

2006/0030280 A1 2/2006 Anderson et al.
2006/0039330 A1* 2/2006 Hackett et al. .............. 370/335
2007/0286124 A1* 12/2007 Grant et al. ................. 370/331

* cited by examiner

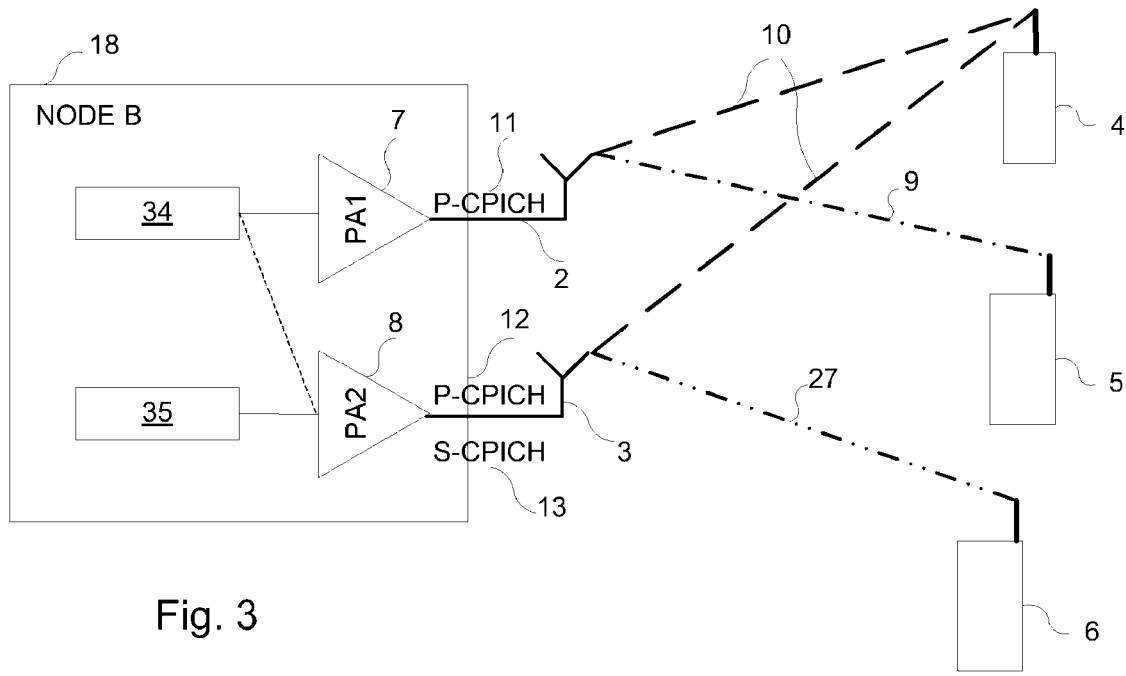
Fig. 3
0 0 0 0 0 0 0 0 0 0 0 0 0 0 0 0 0 0 0 0 0 0 0 0 0 0 0 0
1 1 1 1 0 0 0 0 1 1 1 1 0 0 0 0 1 1 1 1 0 0 0 0 1 1 1 1 0 0
Fig. 4
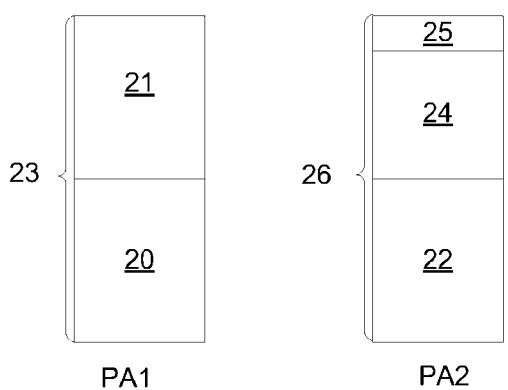
Fig. 5

METHOD AND ARRANGEMENTS FOR LOAD BALANCING OF POWER AMPLIFIERS

CROSS REFERENCE TO RELATED APPLICATIONS

This application claims priority from commonly-assigned U.S. Provisional Patent Application Ser. No. 60/825,600 entitled "SCHEDULING OF VOIP USERS" filed on Sep. 14, 2006 and commonly-assigned U.S. Provisional Patent Application Ser. No. 60/825,606, filed on Sep. 14, 2006, entitled "DISTRIBUTING SIGNALS FOR LOAD BALANCING OF POWER AMPLIFIERS," and also claims priority from European Patent Application, serial number EP07808865.5, filed Sep. 6, 2007; the disclosures of which are incorporated herein by reference.

TECHNICAL FIELD

The present invention relates to method and arrangements for load balancing of power amplifiers in an antenna transmit unit.

BACKGROUND

Multi antenna transmission is expected to become more and more common when increased capacity is needed in telecommunication networks. A number of different multi antenna transmission techniques have been developed such as transmit diversity, beamforming and MIMO (Multiple Input Multiple Output).

Transmit diversity is a multi antenna solution in which an information-bearing signal is transmitted from several antennas along different propagation paths. Transmit diversity may for instance help to overcome the effect of fading, i.e. distortion of the information bearing signals. When using transmit diversity the amount of received signal improvement among others depends on the independence of the transmission characteristics for the signals sent from the different transmission antennas. In the current release of the WCDMA (Wideband Code Division Multiple Access) specification (Rel-6) two different modes of transmit diversity are specified, open loop Space-Time multiple antenna Transmit Diversity (STTD) and a Closed-Loop mode multiple antenna Transmit Diversity (CLTD).

Beamforming using multiple antennas for transmission is a signal processing technique which uses arrays of transmitting antennas that control the directionality of a radiation pattern. When transmitting a signal, beamforming can increase the power in the direction the signal is to be sent and at the same time put a null or minimize the power towards unwanted directions. The change compared with an omnidirectional transmission is known as the array gain. These changes are done by creating beams and nulls in the radiation pattern.

MIMO, refers to the use of multiple antennas both at the transmitter and receiver. MIMO performs spatial information processing with multiple antennas. MIMO technology has attracted attention in wireless communications, since it may offer significant increases in signals throughput and link range without additional bandwidth or transmit power. It achieves this by multiple data stream transmission creating higher spectral efficiency (i.e. more bits per second per Hertz of bandwidth) and link reliability or diversity (reduced fading).

When multiple transmit antennas are deployed at a base station several power amplified parallel signals are needed. One common deployment is to equip each transmit branch with its own power amplifier (PA). In a base station with two transmit antennas each provided its own PA, signals will be sent from both antennas. When multi antenna transmit techniques such as transmit diversity or MIMO is applied, both PAs are loaded. However, these multi antenna techniques may not be applicable to all channels. For example, MIMO is only applicable to the HS-DSCH (High Speed Downlink Shared Channel) in a Wideband Code Division Multiple Access (WCDMA) system, while dedicated channels may be transmitted using only one transmit antenna. Similar problems may exist with transmit diversity. Some channels do not gain by using multiple antenna transmission, this is especially true if the channel is dispersive. It will be shown that multiple antenna transmission might reduce the throughput of HSDPA (High Speed Data Packet Access), and the natural choice might therefore in some situations be to not transmit to HSDPA-users with multiple antenna transmission.

FIG. 1 is a schematic block diagram of a transmit unit 1 according to prior art. In this example the transmit unit 1 is a Node B in a WCDMA system. The transmit unit has a first antenna 2 and a second antenna 3. The first antenna 2 and the second antenna 3 have their own power amplifiers, so in this example there are two power amplifiers, 7 and 8, one per antenna. The transmit unit 1 transmits signals from both antennas. From the first antenna 2 the transmit unit transmits signals using single antenna transmission 9. These single antenna transmission signals 9 are schematically illustrated in FIG. 1 by dashed and dotted lines. From the first antenna 2 and second antenna 3 the transmit unit 1 transmits signals using multiple antenna transmission 10, which are schematically illustrated in FIG. 1 by dashed lines. In this example the signals that are transmitted from both the first antenna 2 and the second antenna 3 are transmitted using transmit diversity as multiple antenna transmission technique but the signals could also be transmitted by using e.g. MIMO.

In FIG. 1 three mobile terminals 4, 5 and 6 are illustrated. The mobile terminals 5 and 6 are configured to receive the signals 9 transmitted with single antenna transmission from the first antenna 2. The mobile terminal 4 is configured to receive the signals 10 transmitted with multiple antenna transmission from both the first antenna 2 and the second antenna 3.

The mobile terminals 4, 5 and 6 need a pilot channel as a reference for channel estimation in order to be able to demodulate the received signals. In the WCDMA standard there is a pilot channel specified that is called the primary common pilot channel (P-CPICH), which is the default channel for demodulating a specific channel in a WCDMA system. The P-CPICH is a downlink physical channel. In case multiple antenna transmission is used on any downlink channel in a cell, the P-CPICH shall be transmitted from both antennas using the same channelization and scrambling code. However in the case with multiple antenna transmission, there is a predefined bit sequence added on the P-CPICH that is transmitted from the second antenna 3.

FIG. 2 shows the power distribution for the two power amplifiers 7 and 8 in the transmit unit 1 in FIG. 1. The transmission of signals using multi antenna transmission 10 from both the first antenna 2 and the second antenna 3 and the transmission of single antenna transmission 9 from the first antenna 2 will result in an unequal power load on the power amplifier 7 and the power amplifier 8. Channels that are transmitted with multi antenna transmission 10 by using the P-CPICH 11 and P-CPICH 12 that are transmitted from both the first antenna 2 and the second antenna 3 will result in a power load 20 on the power amplifier 7 and a power load 22 on the power amplifier 8. Channels that are transmitted with single antenna transmission 9 from the first antenna 2 will result in a power load 21 on the power amplifier 7. The total power load 23 on the power amplifier 7 is therefore higher than the power load 22 on the power amplifier 8. This unequal power load on the power amplifier 7 and on the power amplifier 8 will result in a very inefficient use of the power amplifier resources 7 and 8 in the transmit unit 1 in FIG. 1. The power amplifier 8 will only be utilized to a fraction of its potential.

One solution to the above mentioned problem is to equip the PA resources with a load balancing network. This can be done by e.g. introducing Butler matrices before and after the PA. It is also possible to weight the signals digitally at e.g. the baseband so that they are loading all PAs, and the inverse operation can then be done at the radio frequency level after the PA. The problem with this type of load balancing is that it will likely introduce additional power loss from the load balancing network and it requires as well a replacement of equipment at the cell site, e.g. at technology migration. This will of course increase the cost of deploying e.g. MIMO and the cost of the system.

The European patent application EP 1617570 describes a transmit diversity scheme where the transmission modes can be switched between transmit diversity mode and non diversity mode. The total base station power is generally equally split between the transmit antennas regardless of whether the transmission is in transmit diversity mode or in no transmit diversity mode. Moreover, an additional transmit diversity pilot is only sent when the transmission is in diversity mode. That is, when transmitting in the no transmit diversity mode, no additional diversity pilot is sent, resulting in resource savings.

One of the drawbacks with the prior art solution described in the above mentioned European patent application for load balancing between the two transmit antennas is that it does not provide a mechanism for load balancing when mixing multiple antenna transmission with single antenna transmission. The described prior art mechanism is only concerned with load balancing when the transmission modes are switched between transmit diversity mode and multiple antenna non diversity mode.

Further, in HSDPA the HS-DSCH is shared between mobile terminals using channel-dependent scheduling to take advantage of favorable channel conditions to make best use of available radio conditions. This feature is called multi-user scheduling and obtains a diversity gain since the users with most favorable radio channels can be scheduled in each TTI (Transmission Time Interval). Each mobile terminal periodically transmits an indication of the downlink signal quality. The Node B uses this information received from all mobile terminals to decide which mobile terminals will be sent data on the next 2 ms sub-frame. The allocation of radio resources is done in units of channelization codes, of which 16 channelization codes exist, and of which up to 15 can be allocated for HSDPA-transmission. If a mobile terminal is allocated many channelization codes in a TTI more data can be transmitted to that mobile terminal than if the mobile terminal was allocated fewer channelization codes. The HS-DSCH is not power controlled to obtain a certain transmission quality. Instead the coding and modulation are adapted to follow the fast fading and to obtain a certain transmission quality. The Node B will select the correct modulation and coding scheme for each TTI. The Node B will select a higher modulation level (e.g. 16 QAM Quadrature Amplitude Modulation) for mobile terminals with a better radio channel and a lower modulation level (e.g. QPSK Quadrature Phase-Shift Keying) for the other mobile terminals. 16 QAM uses four bits to represent a symbol, while QPSK uses two bits for the same purpose. Hence 16 QAM doubles the data rate compared to QPSK. The power on the HSDPA channel may however change since one power allocation scheme in HSDPA is to use the remaining power when power allocation to dedicated channels have been done. This means that the HSDPA power would be changing since the power of the dedicated channels are changing.

As mentioned above, it is well known that transmit diversity may harm the throughput in HSDPA. This depends on that transmit diversity will lower the peaks of the fading and hence the data rate of the scheduled user. The dynamic range of the received signal is larger without transmit diversity than with transmit diversity and users can therefore be scheduled at a higher signal level. If the peaks are lower a lower modulation level must be used and hence the data rate is lowered. This effect is illustrated in FIG. 6 where solid lines 60 indicate the fading pattern without transmit diversity while the dash-dotted lines 61 indicate the fading pattern when transmit diversity is applied. It is further illustrated that a considerable gain can be achieved if only fading peaks are used for scheduling data to a particular user and thus avoiding inefficient transmission at fading dips. Therefore, it would also be desirable to be able to utilize existing multiple antenna units to balance the load when only single antenna transmission is used.

SUMMARY

As mentioned above the mix of multi antenna transmission and single antenna transmission result in an unbalance of the power amplifiers in the transmit unit. For the solutions available today it is necessary to modify the transmit unit to overcome the problem with the unbalance of the power amplifiers. Further, it may also be desirable to utilize existing multiple antenna units and to balance the load when only single antenna transmission is used.

An object of the present invention is therefore to provide methods and arrangements to overcome the problem with the unbalance of the power amplifiers in an antenna transmit unit.

The above stated object is achieved by means of a transmit unit and a method for a transmit unit and control units according to the invention.

In accordance with a first aspect of the present invention a transmit unit for transmitting radio communication signals is provided. The transmit unit comprises at least two antennas for transmitting signals relating to a plurality of radio channels. The transmit unit transmits signals relating to a first subset of channels from the first antenna and pilot signals on a first type of pilot channel such as the P-CPICH from said first antenna for use as a reference for said first subset of channels. The transmit unit is further arranged to transmit signals relating to a second subset of channels from the second antenna using single antenna transmission. The transmit unit is further arranged to transmit pilot signals on a second type of pilot channel such as the S-CPICH, different from the first type of pilot channel, from the second antenna for use as a reference for said second subset of channels, wherein the first and second type of pilot channels are substantially covering the same area.

In accordance with a second aspect of the present invention a method for transmitting radio communication signals from a transmit unit with at least two antennas is provided. The method comprises the steps of transmitting signals relating to a first subset of channels by e.g. using single antenna transmission from said first antenna; transmitting pilot signals on a first type of pilot channel from said first antenna for use as a reference for said first subset of channels; transmitting signals relating to a second subset of channels from said second antenna by using single antenna transmission; transmitting pilot signals on a second type of pilot channel different from said first type of pilot channel from said second antenna for use as a reference for said second subset of channels, wherein the first and second type of pilot channels are covering substantially the same area.

In accordance with a third aspect a control unit for controlling a transmit unit is provided. The transmit unit is having at least two antennas for transmitting signals relating to a plurality of radio channels. The control unit comprises means for controlling the transmit unit to: transmit signals relating to a first subset of channels from the first antenna; transmit pilot signals on a first type of pilot channel from the first antenna for use as a reference for the first subset of channels; transmit signals relating to a second subset of channels from the second antenna by using single antenna transmission; transmit pilot signals on a second type of pilot channel, different from the first type of pilot channel, from the second antenna for use as a reference for the second subset of channels, wherein the first and second type of pilot channels are substantially covering the same area.

In accordance with a fourth aspect of the present invention a control unit for controlling mobile terminals is provided. The control unit is adapted to instruct mobile terminals that are wirelessly connected to the control unit via a transmit unit of which type of pilot signals to be used as a reference transmitted from the transmit unit with at least two antennas wherein the control unit comprises means for:
dividing the mobile terminals into at least a first and a second group based on capabilities or requirements of the mobile terminals; instructing the first group of mobile terminals to use a first type of pilot channel transmitted from the first antenna of the at least two antennas to be used as a reference; instructing the second group of mobile terminals to use a second type of pilot channel transmitted from the second antenna of the at least two antennas to be used as a reference, wherein the first and second type of pilot channels are covering substantially the same area.

An advantage of embodiments of the present invention is that is provides a tool for load balancing between power amplifiers on different transmit branches in a transmit unit that transmits a mix of multi antenna transmission and single antenna transmission.

Another advantage of embodiments of the present invention is that it does not require any changes to the hardware in the transmit unit to make it possible for the transmit unit to perform the above mentioned method for load balancing between power amplifiers on different transmit branches. This will reduce the cost for implementing the invention in existing transmits units.

A further advantage of embodiments of the present invention is that it provides a method and a transmit unit for load balancing with channels that gain from being transmitted with single antenna transmission e.g. channels for HSDPA transmission.

Yet a further advantage of embodiments of the present invention is that it makes it possible to increase the capacity and throughput for HSDPA users and to reach HSDPA user that are far away from the transmit unit or have a bad radio channel to the transmit unit with fewer canalization codes Yet a further advantage of embodiments of the present invention is that it makes it possible to extend the range of coverage for many low rate users, e.g. VoIP users.

Using the S-CPICH 13 as a pilot channel from the second antenna 3 for single antenna transmission 27 is also a solution to overcome the problem with non-standard compliant mobile terminals that do not support reception of multi antenna transmissions.

Another advantage with this embodiment of the invention is that transmitting the S-CPICH 13 from the second antenna 3 does not require any changes to the WCDMA standards, since the mobile terminal 6 does not have to be aware of that the single antenna transmission 27 is transmitted from the second antenna 3 instead of the first antenna.

Further features of embodiments of the present invention will become apparent when reading the following detailed description in conjunction with the drawings.

BRIEF DESCRIPTION OF THE DRAWINGS

FIG. 3 is a schematic block diagram of a transmit unit according to one embodiment of the invention FIG. 4 shows the P-CPICH for a primary antenna and the bit sequence added to the P-CPICH for a secondary antenna.

FIG. 5 shows the power distribution between the two power amplifiers in the embodiment of the invention according to FIG. 3.

DETAILED DESCRIPTION

Figure 1:
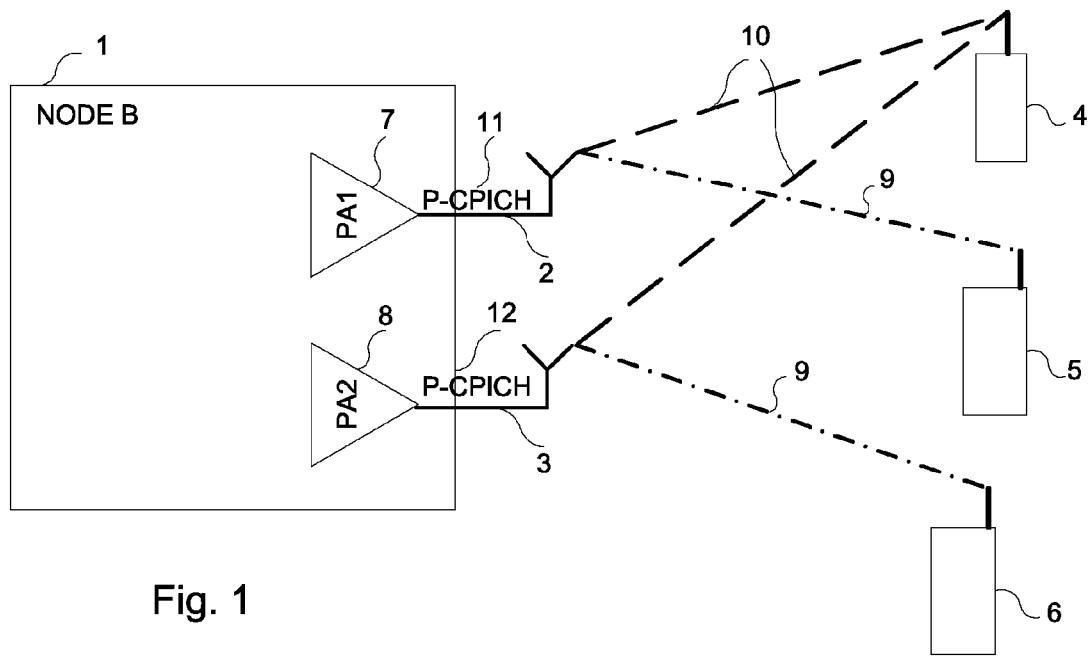
FIG. 1 is a schematic block diagram of a transmit unit according to prior art.
Figure 2:
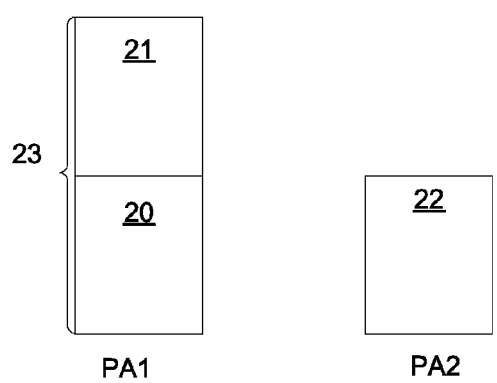
FIG. 2 shows the power distribution on the two power amplifiers in the transmit unit in FIG. 1.
Figure 6:
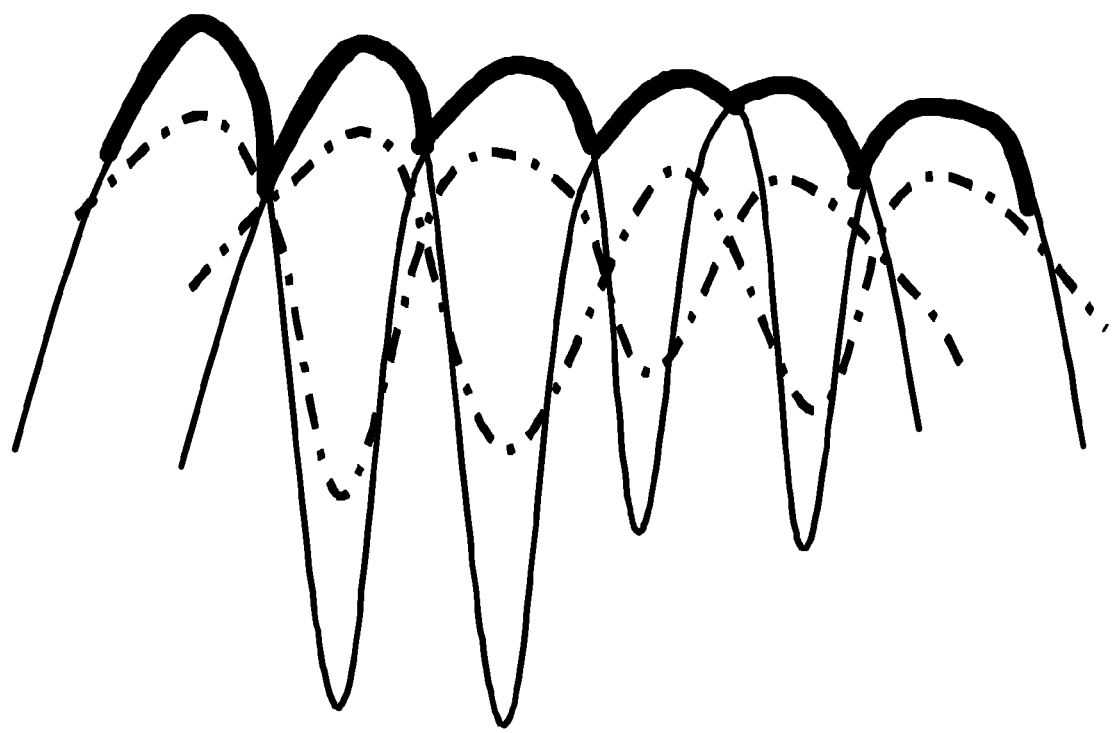
FIG. 6 shows the fading pattern without transmit diversity and the fading pattern when transmit diversity is applied.

The present invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

As stated above, the primary common pilot channel P-CPICH is used as a reference in the WCDMA standard for the first antenna when single antenna transmission is used and also for the first antenna and the second antenna when multiple antenna transmission is used. It should be noted as described above that a bit sequence is added on the P-CPICH transmitted from the second antenna for multiple antenna transmission.

In the WCDMA standard there is also a pilot channel that is called the secondary common pilot channel S-CPICH. The intention of this channel is that it should be used in multi antenna transmission techniques such as beamforming. The primary and secondary common pilot channels differ from each other in their use and the limitations placed on their physical features. The same channelization code is always used for the P-CPICH while an arbitrary channelization code of spreading factor=256 is used for the S-CPICH. The P-CPICH is scrambled by the primary scrambling code and the S-CPICH is scrambled by either the primary or a secondary scrambling code. There is one and only one P-CPICH per cell but there may be zero, one or several S-CPICH per cell. The P-CPICH is broadcasted over the entire cell but the S-CPICH may be transmitted over the entire cell or only a part of the cell. The P-CPICH is therefore another type of pilot channel than the S-CPICH.

As mentioned above the S-CPICH was added to the WCDMA standard to be used as pilot channel for channels that are transmitted with multiple antenna transmission techniques such as beamforming. The reason for this is that the default pilot channel, the P-CPICH, can not be used for demodulating the beam formed data. That depends on that the P-CPICH needs to be transmitted over the whole cell, and hence experiences another radio environment than the traffic channel that is transmitted in a narrow beam caused by the beamforming.

In accordance with the present invention pilot signals are transmitted on a pilot channel of a second type from the second antenna of a transmit unit having at least two transmit antennas by using single antenna transmission. The pilot channel of the second type such as the S-CPICH is intended to be used as a reference for mobile terminals by using single antenna transmission, which results in that the second antenna can also be used for single antenna transmission.

In accordance with a first embodiment of the invention, it is possible to balance the load on the PA associated with the antennas when mixing multiple antenna transmission and single antenna transmission by also directing single antenna transmission from the second antenna. Thus the first and second antennas may be used for multi antenna transmission and both the first and the second antennas may be used for single antenna transmission.

In accordance with a second embodiment of the invention, it is possible to utilize the PA resources associated with the antennas to a greater extend when transmitting single antenna transmission from both the first antenna by also directing single antenna transmission from the second antenna. Thus, both the first and the second antennas can be used for single antenna transmission.

These embodiments will be described further with the following examples.

FIG. 3 is a schematic block diagram of a transmit unit 18 according to the first embodiment of the invention. In this embodiment of the invention the transmit unit 18 is a Node B in a WCDMA system, but the invention is neither limited to two antennas nor Node Bs in a WCDMA system. Further, in the embodiment of the invention according to FIG. 3 there are three mobile terminals 4, 5 and 6 which receive signals from the transmit unit 18. However, the number of mobile terminals is not limited to three.

The first antenna 2 and the second antenna 3 have their own power amplifiers, so in this embodiment of the invention there are two power amplifiers 7 and 8, one per antenna. The transmit unit 18 has first means 34 to transmits signals from both the first antenna 2 and the second antenna 3 by using multi antenna transmission. The use of multi antenna transmission (e.g. transmit diversity or MIMO) is advantageous for certain types of channels (e.g. DPCH Dedicated Physical Channel) as has been explained above. The transmit unit 18 therefore uses multi antenna transmission 10 from the first antenna 2 and the second antenna 3 for such channels. For other types of channels e.g. HS-DSCH it is more advantageous to use single antenna transmission, the transmit unit 18 therefore transmits signals using single antenna transmission 9 from the first antenna 2 for such channels.

If the transmit unit 18 only transmits by using multiple antenna transmission from the first and second antenna 2 and 3 and single antenna transmission from the first antenna 2 the power load on the power amplifiers will be unequal. According to this embodiment of the invention the problem with the unbalance of the power amplifiers 7 and 8 is solved by means 35 for transmitting single antenna transmission from the second antenna 3, which is made possible by using a pilot channel of a second type such as the S-CPICH on the second antenna as will be explained below. It should be noted that the P-CPICH is referred to as the pilot channel of a first type and the S-CPICH is referred to as the pilot channel of a second type in this specification. However, the present invention is not limited to P-CPICH or S-CPICH.

The mobile terminals 4, 5 and 6 need a pilot channel to be used as a reference for the received signals. Since the transmit unit 18 transmits multi antenna transmission 10 from the first antenna 2 and the second antenna 3 a pilot channel needs to be transmitted from both the first antenna 2 and the second antenna 3 to be used as a reference. The P-CPICH 11 is transmitted from the first antenna 2 and the P-CPICH 12 with a bit sequence that defines the second antenna 3 is transmitted from the second antenna 3 for this purpose. In order to obtain a more balanced power load on the power amplifiers 7 and 8 the transmit unit 18 also, as mentioned above, transmits single antenna transmission from the second antenna 3 by using a pilot channel of a second type such as the S-CPICH. The mobile terminal 6 that receives the single antenna transmission 27 from the second antenna 3 is therefore instructed to use the pilot channel of the second type as a reference for the single antenna transmission 27 from the second antenna 3. The mobile terminal 6 is instructed by signaling from its Serving Radio Network Controller (S-RNC) to receive single antenna transmission 27 and that it should use the S-CPICH 13 as a pilot channel. The mobile terminal 6 that receives the single antenna transmission 27 from the second antenna 3 can not use the P-CPICH 12 as a pilot channel. That depends on that the mobile terminal 6 is not configured to receive multi antenna transmission. Since it is not configured to receive multi antenna transmission, it is unaware of the second antenna and does not recognize the bit sequence on the P-CPICH 12.

Thus, in accordance with the present invention the pilot channel of a second type such as the S-CPICH is used for single antenna transmission sent from the second antenna. This differs from prior art where the S-CPICH 13 normally is sent from the first antenna 2. Further, the S-CPICH 13 is also normally used by mobile terminals to decode channels that have been transmitted with multi antenna transmission e.g. beamforming. Hence, by using the mechanism of the present invention, channels normally transmitted from the first antenna 2 using single antenna transmission can also be transmitted from the second antenna 3 using single antenna transmission 27. Single antenna transmission 9 and 27 can therefore be used from both the first antenna 2 and the second antenna 3 which may lead to a more balanced power load on the power amplifiers 7 and 8.

FIG. 5 shows the power distribution between the two power amplifiers 7 and 8 in the embodiment of the invention according to FIG. 3. The power distribution, as will be explained below, will become more balanced between the two power amplifiers 7 and 8 when the second antenna also can transmit by using single antenna transmission. Channels that are transmitted with multiple antenna transmission 10 and the P-CPICH 11 and 12 that are transmitted from both the first antenna 2 and the second antenna 3 will result in a power load 20 on the power amplifier 7 and a power load 22 on the power amplifier 8. Channels that are transmitted with single antenna transmission 9 from the first antenna 2 will result in a power load 21 on the power amplifier 7 and channels that are transmitted with single antenna transmission 27 from the second antenna 3 will result in a power load 24 on the power amplifier 8. The S-CPICH 13 that is transmitted from the second antenna will result in a power load 25 on the power amplifier 8.

The total power load 23 on the power amplifier 7 is therefore on the same level as the total power load 26 on the power amplifier 8. This more balanced power load on the power amplifiers 7 and 8 will result in a more efficient use of the power amplifier resources 7 and 8 in the transmit unit 18 in FIG. 3. This embodiment of the invention can therefore be used as a tool for dividing single antenna transmission 9 and 27 between the two transmit antennas 2 and 3 and thereby achieve a more balanced power load on the two power amplifiers 7 and 8.

In the CDMA 2000 standards the mobile terminals also use different pilot channels to decode different channels. The channels are used in a similar way as in the WCDMA standards. The channel that corresponds to the P-CPICH in the WCDMA standards is called common pilot channel and the channel that corresponds to the S-CPICH in the WCDMA standards is called Auxiliary Pilot Channel.

The embodiment of the invention described above, is an arrangement to solve the problem with unequal power load between power amplifiers on different transmit branches that can occur when a mix of multi antenna transmission and single antenna transmission are transmitted from a transmit unit. In other cases, such as in certain transmission situations when the mobile terminals have lower bandwidth demands (e.g. VoIP) or when there is a desire to increase the cell coverage another embodiment of the invention, that will be described below, can be more suitable. According to this embodiment of the invention, single antenna transmission is transmitted from both the first and the second antenna, which is possible by transmitting the S-CPICH from the second antenna in accordance with the present invention.

Figure 7:
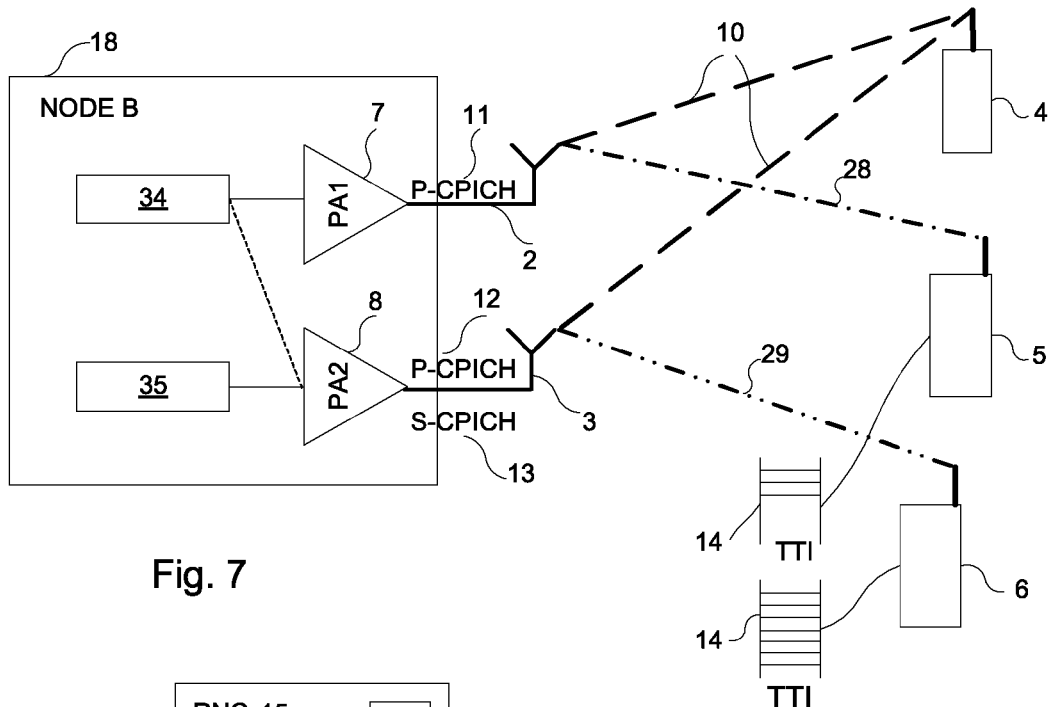
FIG. 7 is a schematic block diagram of a transmit unit according to one embodiment of the invention.

FIG. 7 is a schematic block diagram of a transmit unit 18 according to another embodiment of the invention. In this embodiment of the invention the transmit unit 18 is a Node B in a WCDMA system, and the Node B has two antennas 2, 3. However the invention is not limited to Node Bs with two antennas in a WCDMA system.

The first antenna 2 and the second antenna 3 have their own power amplifiers, so in this embodiment of the invention there are two power amplifiers 7 and 8, one per antenna. The transmit unit 18 has first means 34 to transmit signals on the High Speed Downlink Shared Channel (HS-DSCH) from the first antenna 2 using single antenna transmission 28 to the mobile terminal 5. The P-CPICH is being used as reference. As described previously, the P-CPICH is a pilot channel of a first type.

According to this embodiment of the invention the transmit unit power amplifier resources are utilized to a greater extent by also transmitting signals on the HS-DSCH by using single antenna transmission 29 from the second antenna 3, which is made possible by using a pilot channel of a second type such as the S-CPICH to be used as a reference.

The HS-DSCH is normally transmitted only from the first antenna 2 in case of single antenna transmission but according to this embodiment of the invention the HS-DSCH may be transmitted using single antenna transmission both from the first and second antennas 2 and 3. To transmit the HS-DSCH using single antenna transmission from both the first antenna 2 and the second antenna 3 is made possible by means 35 according to an embodiment of the invention by using the S-CPICH 13 as a pilot channel from the second antenna 3 and by dividing the channelization codes on the HS-DSCH between the first antenna 2 and the second antenna 3. In this example the HS-DSCH contains 15 channelization codes. Eight of these channelization codes are dedicated to mobile terminals which receive single antenna transmission 28 from the first antenna 2 and seven of these channelization codes are dedicated to mobile terminals which receive single antenna transmission 29 from the second antenna 3. The transmit unit 18 schedules different number of channelization codes to the mobile terminals 5 and 6 depending on the channel quality and the demand for data rate. The transmit unit can however dedicate different number of channelization codes to the first antenna 2 and the second antenna 3 at different moments in time. In FIG. 7 a TTI 14 is shown. In this TTI 14 the transmit unit has scheduled three out of the 8 available channelization codes on the first antenna 2 to the mobile terminal 5 and 6 out of the 7 available channelization codes on the second antenna 3 to the mobile terminal 6. The power on the signal sent from the second antenna 3 is therefore higher than the power on the signal sent from the first antenna 2.

The number of channelization codes that are scheduled to the mobile terminals 5 and 6 in the TTI 14 in this embodiment of the invention is only an example. In other TTIs the number to channelization codes to the mobile terminals 5 and 6 could be different than the number of channelization codes shown in FIG. 7, The number of channelization codes allocated depends on among others the channel quality to the mobile terminals 5 and 6 and the demand for data rate to the mobile terminals 5 and 6.

In this embodiment of the invention where the channelization codes on the HS-DSCH is divided between the first antenna 2 and the second antenna 3 the available power on each channelization code on the HS-DSCH will increase since the power resources from both power amplifiers 7 and 8 are used. In a situation where a number of low rate users are present, this split between using the first antenna 2 and second antenna 3 for a certain group of mobile terminals can be fixed. Since little scheduling gain is present, the loss relative an optimal dynamic allocation where the mobile terminals with the best channels are scheduled would be small.

Another advantage of this embodiment of the invention is that channels, such as shared HSDPA channels, that gain from being transmitted with single antenna transmission can be transmitted from both antennas and thus both PAs can be used to almost full capacity. A further advantage of this embodiment of the invention is that more users can be scheduled at a given TTI since each channelization code on the two antennas has higher power compared to if all channelization codes were sent from one antenna, with only the available power resources from one power amplifier. This since users that are far away from the transmit unit can be reached with less number of channelization codes. A further advantage of this embodiment of the invention is that mobile terminals that are far away from the transmit unit or have a bad radio channel to from the transmit unit can be reached with fewer channelization codes since each channelization code has a higher effect.

The Radio Network Controller (RNC) in a WCDMA system is responsible for control of the Node-Bs in a WCDMA system. The RNC among others carries out radio resource management. In a relationship to the mobile terminal the RNC can be a controlling RNC (C-RNC) or a serving RNC (S-RNC). The C-RNC is responsible for allocating recourses to the Node B that is serving the terminal which implies that the C-RNC for instance informs the Node B which pilot channel the Node B should transmit from its different transmit antennas. The S-RNC is instead responsible for allocating resources to the mobile terminal, for instance to inform the mobile terminal which pilot channel or pilot channels that the mobile terminal should use as a reference.

Figure 9:
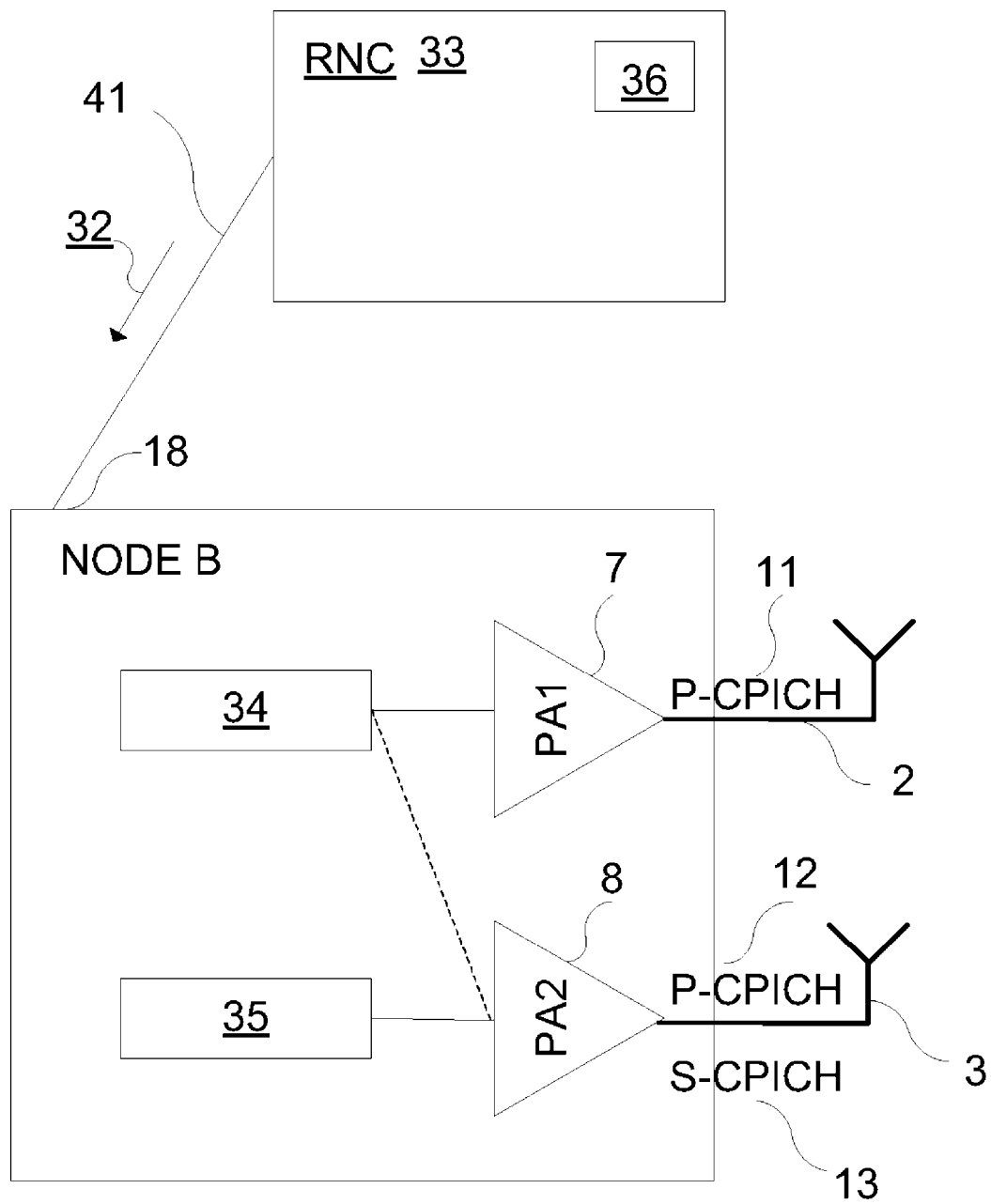
FIG. 9 is a schematic block diagram of a control unit and a transmit unit according to one embodiment of the invention

FIG. 9 is a schematic block diagram of a transmit unit 18 and a control unit 33 according to another embodiment of the invention. In this embodiment of the invention the transmit unit 18 is a Node B in a WCDMA system and the control unit 33 is a Controlling Radio Network Controller (C-RNC) in WCDMA system. The invention is however not limited to Node Bs and C-RNCs in a WCDMA system. The transmit unit 18 and control unit 33 can be of many other types in other systems.

The control unit 33 is responsible for resource allocation to the Node B. The control unit 33 comprises therefore means 36 for controlling the transmit unit 18. The transmit unit 18 is connected to the control unit 33 via a connection 34 for transmitting messages between the transmit unit 18 and the control unit 33. The transmit unit 18 has two power amplifiers 7 and 8 where the first power amplifier 7 amplifies signals sent from the first antenna 2 and where the second power amplifier 8 amplifies signals sent from the second antenna 3. In this example the control unit 33 decides that the transmit unit 18 should transmit single antenna transmission from the first antenna 2 by means 34 (see the continuous line), single antenna transmission from the second antenna 3 by means 35 and multiple antenna transmission from both the first antenna 2 and the second antenna 3 by means 34 (see the dotted line). The control unit 33 sends a message 32 to the transmit unit 18 to inform the transmit unit that is should transmit the P-CPICH 11 from the first antenna, the P-CPICH 12 with the bit sequence from the second antenna 3 and the S-CPICH 13 from the second antenna. The message 32 also informs the transmit unit 18 that is should transmit single antenna transmission from the first antenna 2, single antenna transmission from the second antenna 3 and multiple antenna transmission from both the first antenna 2 and the second antenna 3.

Figure 8:
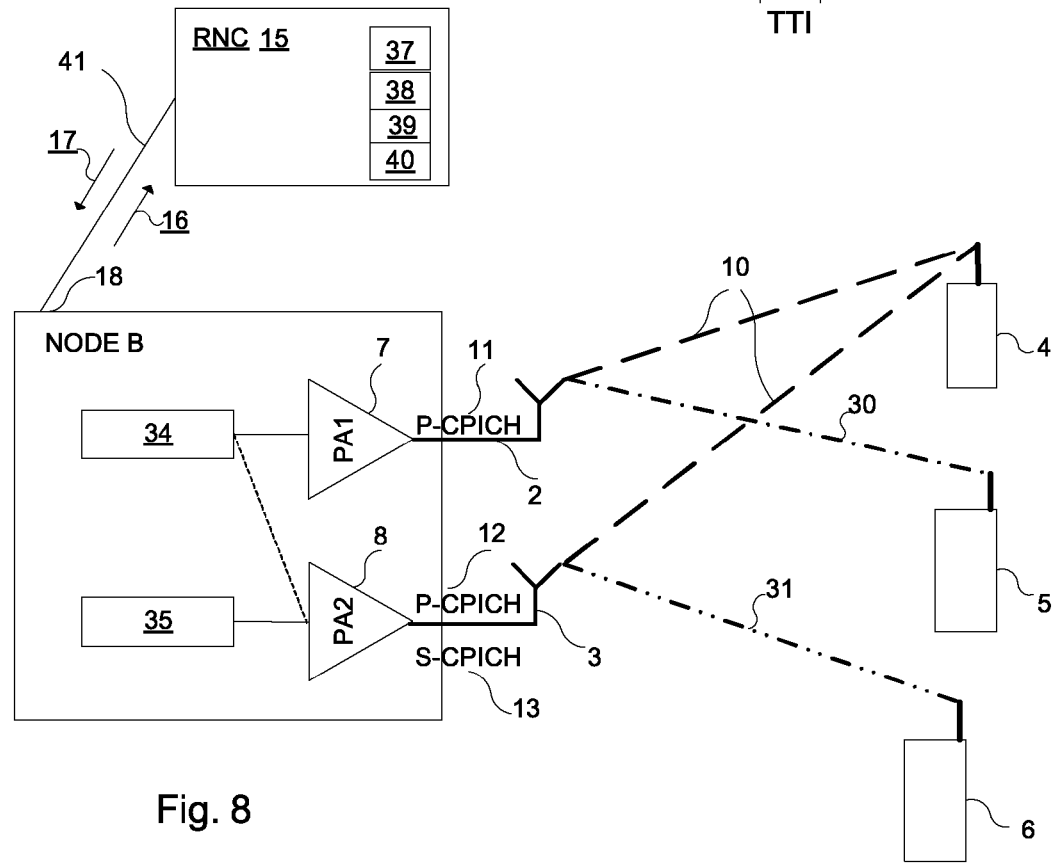
FIG. 8 is a schematic block diagram of a control unit and a transmit unit according to one embodiment of the invention

FIG. 8 is a schematic block diagram of a transmit unit 18 and a control unit 15 according to another embodiment of the invention. In this embodiment of the invention the transmit unit 18 is a Node B in a WCDMA system and the control unit 15 is a Serving Radio Network Controller (S-RNC) in WCDMA system. The invention is however not limited to Node Bs and S-RNCs in a WCDMA system. The transmit unit 18 and control unit 15 can be of many other types in other systems.

The control unit 15 is responsible for resource allocation to the mobile terminal. The control unit 15 comprises therefore means 37 for instructing the mobile terminals 4, 5 and 6 to use specific resources from the transmit unit. The transmit unit 18 is connected to the control unit 15 via a connection 41 for transmitting messages between the transmit unit 18 and the control unit 15.

The transmit unit 18 has two power amplifiers 7 and 8 where the first power amplifier 7 amplifies signals sent from the first antenna 2 and where the second power amplifier 8 amplifies signals sent from the second antenna 3. The power amplifiers 7 and 8 have a maximum available power that limits how many channels that can be set up from the first antenna 2 and the second antenna 3. In this example the transmit unit 18 transmits signals using multi antenna transmission 10 from the first antenna 2 and the second antenna 3 to the mobile terminal 4. The transmit unit 18 also transmits signals using single antenna transmission 9 by means 34 from the first antenna 2 to the mobile terminal 5. At this given time there are therefore more power resources available on the second power amplifier 8 than on the first power amplifier 7.

The control unit comprises means for dividing 38 the mobile terminals 4, 5 and 6 and other mobile terminals (not shown) into groups based on their capabilities (e.g. mobile terminals that support multiple antenna transmission techniques) and the requirements of the mobile terminals (e.g. real time requirements and guaranteed bit rate requirements). The groups may then be used when a new channel is about to be set up to decide from which antennas the channel should be transmitted.

At a later point in time it is desirable to set up a new channel to a mobile terminal 6. The control unit finds out that the mobile terminal 6 belongs to a group of mobile terminals that does not support multi antenna transmission 10. The new radio channel to the mobile terminal 6 therefore has to be transmitted using single antenna transmission. The transmit unit 18 has to decide if the signals on the channel shall be transmitted from the first antenna 2 using the P-CPICH 11 by means 34 or from the second antenna using the S-CPICH 13 by means 35.

In this example it is preferable if the control unit 15 decides that the new channel is to be transmitted from the second antenna 3, since there are more power resources on the second power amplifier 8 than on the first power amplifier 7, thus balancing the power amplifiers. In order for the control unit 15 to know how much power resources each power amplifier 7 and 8 have left until they reach their maximum capacity the transmit unit 18 transmit a message 16 to the control unit 15, received by means 39, which indicates how much power resources that is left on the first power amplifier 7 and on the second power amplifier 8. Based on the information how much power resources that is available on the first power amplifier 7 and how much power resources that is available on the second power amplifier 8 the control unit 15 may then decide by means 40 from which antenna the signals on the channel shall be transmitted to the mobile terminal 6. In this example there is more power resources available on the second power amplifier 8 so the control unit 15 decides that the signals on the channel that is about to be set up to the mobile terminal 6 should be transmitted from the second antenna 3. When the control unit 15 has decided from which antenna the signals on the channel to the mobile terminal 6 shall be transmitted the control unit transmits a message 17 via the transmit unit 18 to the mobile terminal 6 that informs the mobile terminal 6 that it should not use the P-CPICH as reference but instead use the S-CPICH. The message 17 also contains information to the transmit unit 18 that is should transmit the channel from the second antenna 3.

The antenna can not be a parameter when scheduling user in each TTI when transmitting HSDPA using single antenna transmission from both the first (2) and the second antenna (3) according to one embodiment of the invention, since reconfiguring a radio link from one antenna to another antenna involves RNC signaling, for which the time frame is much larger than the 2 ms TTI, which is the basis in the scheduler. In the embodiment of the invention according to FIG. 8 the control unit 15 sends a message 17 via the transmit unit 18 instructing the mobile terminal 6 to use either the P-CPICH or the S-CPICH as reference. To set up a new channel is not as time critical as scheduling mobile terminals in different TTIs and there is therefore enough time for the message exchange 16 and 17 between the control unit 15 and the mobile terminal 6 when a new channel is about to be set up.

Figure 10:
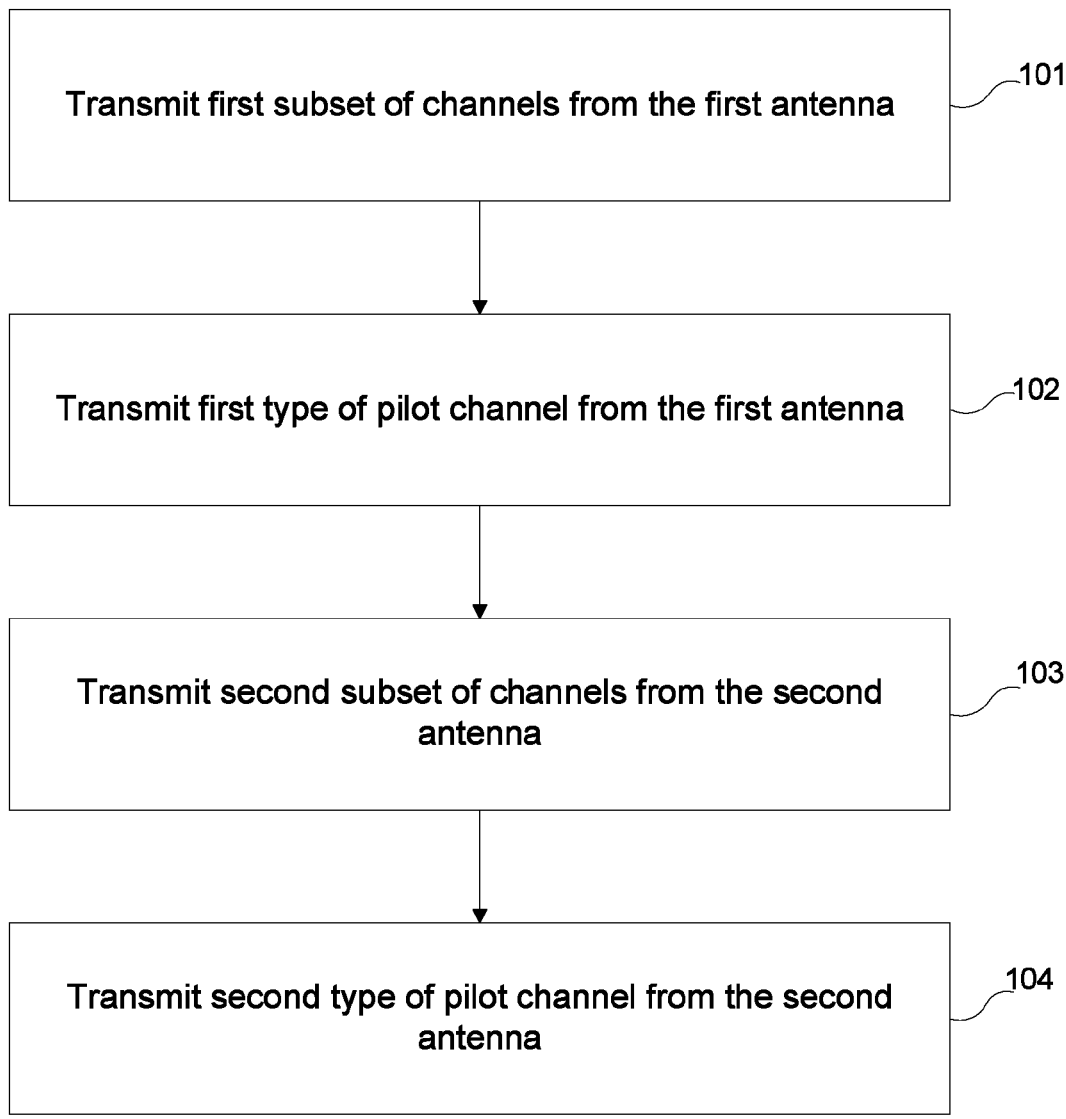
FIG. 10 is a flowchart of a method according to one embodiment of the invention

FIG. 10 is a flowchart that illustrates a method in a transmit unit with at least two antennas for transmitting radio communication signals according to the present invention. In a step 101, signals relating to a first subset of channels from the first antenna are transmitted. In a step 102 pilot signals on a first type of pilot channel from the first antenna (2) for use as a reference for the first subset of channels are transmitted. In a step 103 signals relating to a second subset of channels from the second antenna (3) by using single antenna transmission are transmitted. In a step 104 pilot signals on a second type of pilot channel different from the first type of pilot channel are transmitted from the second antenna (3) for use as a reference for the second subset of channels, wherein the first and second type of pilot channels are covering substantially the same area.

The invention claimed is:

1. A transmit unit for transmitting radio communication signals in a High Speed Downlink Packet Access, HSDPA, system, the transmit unit comprising:
 at least a first power amplifier coupled to a first antenna and a second power amplifier coupled to a second antenna for transmitting signals relating to a plurality of radio channels;
 first transmitting means configured to:
  transmit from both the first and second antennas using multi-antenna transmission, signals relating to a Dedicated Physical Channel, DPCH, using a first subset of channelization codes;
  transmit from both the first and second antennas using multi-antenna transmission, pilot signals on a first type of pilot channel for use as a reference for the DPCH using said first subset of channelization codes; and
  transmit from only the first antenna using single antenna transmission, signals relating to a High Speed Downlink Shared Channel, HS-DSCH, using a second subset of said channelization codes; and
 second transmitting means configured to:
  transmit only from the second antenna using single antenna transmission, signals relating to another channel that benefits from single antenna transmission; and
  balance a power load on the first and second power amplifiers by transmitting only from the second antenna using single antenna transmission, pilot signals on a second type of pilot channel, different from said first type of pilot channel, for use as a reference for the other channel and the HS-DSCH using said second subset of channelization codes;
 wherein the first subset of channelization codes together with the second subset of channelization codes covers the totality of the channelization codes of the HSDSCH, and wherein the first and second type of pilot channels are substantially covering the same area.

2. The transmit unit according to claim 1, wherein said first type of pilot channel is a Primary Common Pilot Channel (P-CPICH) in a Wideband Code Division Multiple Access (WCDMA) system.

3. The transmit unit according to claim 1, wherein said second type of pilot channel is a Secondary Common Pilot Channel (S-CPICH) in a Wideband Code Division Multiple Access (WCDMA) system.

4. A method of transmitting radio communication signals from a transmit unit in a High Speed Downlink Packet Access, HSDPA, system, the transmit unit having at least a first power amplifier coupled to a first antenna and a second power amplifier coupled to a second antenna for transmitting signals relating to a plurality of radio channels, the method comprising the steps of:
 transmitting from both the first and second antennas using multi-antenna transmission, signals relating to a Dedicated Physical Channel, DPCH, using a first subset of channelization codes;
 transmitting from both the first and second antennas using multi-antenna transmission, pilot signals on a first type of pilot channel for use as a reference for the DPCH using the first subset of channelization codes;
 transmitting from only the first antenna using single antenna transmission, signals relating to a High Speed Downlink Shared Channel, HS-DSCH, using a second subset of channelization codes;
 transmitting from only the second antenna using single antenna transmission, signals relating to another channel that benefits from single antenna transmission; and
 balancing a power load on the first and second power amplifiers by transmitting only from the second antenna using single-antenna transmission, pilot signals on a second type of pilot channel different from the first type of pilot channel for use as a reference for the other channel and the HS-DSCH using the second subset of channelization codes;
 wherein the first subset of channelization codes together with the second subset of channelization codes covers the totality of the channelization codes of the HS-DSCH, and wherein the first and second type of pilot channels are covering substantially the same area.

5. The method according to claim 4, wherein said first type of pilot channel is a Primary Common Pilot Channel (P-CPICH) in a Wideband Code Division Multiple Access (WCDMA) system.

6. The method according to claim 4, wherein said second type of pilot channel is a Secondary Common Pilot Channel (S-CPICH) in a Wideband Code Division Multiple Access (WCDMA) system.

7. A control unit for controlling a transmit unit in a High Speed Downlink Packet Access, HSDPA, system, the transmit unit having at least a first power amplifier coupled to a first antenna and a second power amplifier coupled to a second antenna for transmitting signals relating to a plurality of radio channels, wherein said control unit is configured to control the transmit unit to:
 transmit from both the first and second antennas using multi-antenna transmission, signals relating to a Dedicated Physical Channel, DPCH, using a first subset of channelization codes;
 transmit from both the first and second antennas using multi-antenna transmission, pilot signals on a first type of pilot channel for use as a reference for the DPCH using the first subset of channelization codes;
 transmit from only the first antenna using single antenna transmission, signals relating to a High Speed Downlink Shared Channel, HS-DSCH, using a second subset of channelization codes;
 transmit from only the second antenna using single antenna transmission, signals relating to another channel that benefits from single antenna transmission; and
 balance a power load on the first and second power amplifiers by transmitting only from the second antenna using single-antenna transmission, pilot signals on a second type of pilot channel different from the first type of pilot channel for use as a reference for the other channel and the HS-DSCH using the second subset of channelization codes;
 wherein the first subset of channelization codes together with the second subset of channelization codes covers the totality of the channelization codes of the HS-DSCH, and wherein the first and second type of pilot channels are substantially covering the same area.

8. The control unit according to claim 7 wherein the control unit is further configured to:
  receive information about available power resources on each power amplifier connected to each of the at least two antennas; and
  control the transmit unit based on the received information.

9. The control unit according to claim 7, wherein said first type of pilot channel is a Primary Common Pilot Channel (P-CPICH) in a Wideband Code Division Multiple Access (WCDMA) system.

10. The control unit according to claim 7, wherein said second type of pilot channel a Secondary Common Pilot Channel (S-CPICH) in a Wideband Code Division Multiple Access (WCDMA) system.

* * * * *